US012609241B2

(12) United States Patent
Bonnefous

(10) Patent No.: US 12,609,241 B2
(45) Date of Patent: Apr. 21, 2026

(54) METHOD FOR MANUFACTURING LOOPS FOR A MAGNETIC CIRCUIT

(71) Applicant: SAFRAN ELECTRICAL & POWER, Blagnac Cedex (FR)

(72) Inventor: Edouard Bonnefous, Moissy-Cramayel (RE)

(73) Assignee: SAFRAN ELECTRICAL & POWER, Blagnac Cedex (FR)

( * ) Notice: Subject to any disclaimer, the term of this patent is extended or adjusted under 35 U.S.C. 154(b) by 762 days.

(21) Appl. No.: 18/005,680

(22) PCT Filed: Jul. 8, 2021

(86) PCT No.: PCT/FR2021/051262

§ 371 (c)(1),
(2) Date: Jan. 17, 2023

(87) PCT Pub. No.: WO2022/018344

PCT Pub. Date: Jan. 27, 2022

(65) Prior Publication Data

US 2023/0282416 A1 Sep. 7, 2023

(30) Foreign Application Priority Data

Jul. 20, 2020 (FR) ........................................ 2007578

(51) Int. Cl.
*H01F 7/06* (2006.01)
*H01F 41/10* (2006.01)

(52) U.S. Cl.
CPC .................................... *H01F 41/10* (2013.01)

(58) Field of Classification Search
CPC ....... H01F 41/0233; H01F 41/10; H01F 30/12
See application file for complete search history.

(56) References Cited

U.S. PATENT DOCUMENTS 5,798,594 A * 8/1998 Radovsky ................ H02K 1/24 310/263
8,298,226 B2 * 10/2012 Hosier ............... A61B 18/1442 606/51

(Continued)

FOREIGN PATENT DOCUMENTS

EP 0010427 A1 4/1980
EP 2395521 A1 12/2011

(Continued)

OTHER PUBLICATIONS

International Search Report for Application No. PCT/FR2021/051262 dated Oct. 27, 2021.

(Continued)

*Primary Examiner* — Paul D Kim
(74) *Attorney, Agent, or Firm* — McDonald Hopkins LLC

(57) ABSTRACT

A method for manufacturing magnetic circuit loops for a multi-phase transformer from a magnetic strip including: a) providing a magnetic strip of constant width in a roll wound around a first circular mandrel and extending along a longitudinal axis; b) cutting the roll into a first and a second half-roll each having a longitudinal axis comprising a respective boundary surface formed once it is separated from the other half-roll, the roll being cut slantwise at an angle θ relative to the longitudinal axis, such that the first half-roll constitutes a first loop having its boundary surface outwardly oriented relative to its longitudinal axis, while the boundary surface of the second half-roll is oriented opposite to the boundary surface of the first half-roll; c) aligning the first and second half-rolls to form two loops, including at least one sub-step of reversely unwinding and rewinding the second half-roll on a mandrel.

10 Claims, 8 Drawing Sheets

(56) References Cited

U.S. PATENT DOCUMENTS

| | | | | |
|---|---|---|---|---|
| 2013/0088314 | A1* | 4/2013 | Francoeur .............. | C21D 8/125 29/33 F |
| 2021/0372193 | A1* | 12/2021 | Minaudo ............. | E06B 3/26303 |

FOREIGN PATENT DOCUMENTS

| | | | |
|---|---|---|---|
| WO | 2013108247 | A1 | 7/2013 |
| WO | 2013184872 | A1 | 12/2013 |

OTHER PUBLICATIONS

Written Opinion for PCT/FR2021/051262 dated Oct. 27, 2021.
Search Report issued in French Patent Application No. 2007578 dated Mar. 29, 2021.

* cited by examiner

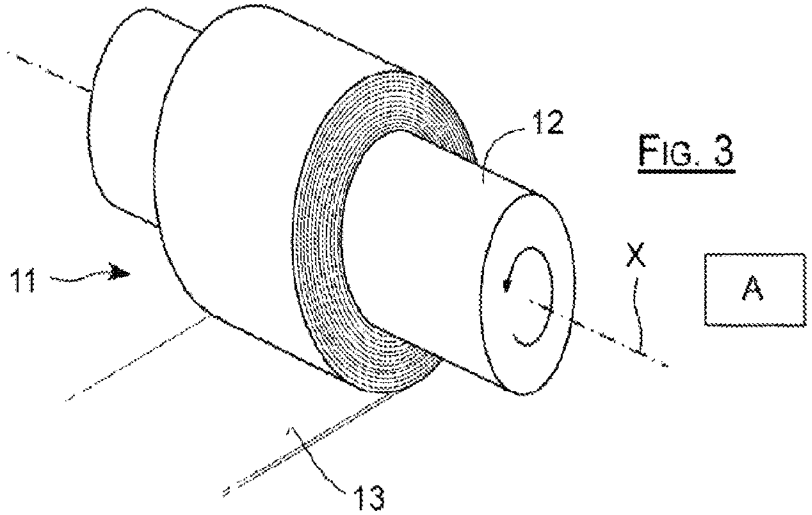
FIG. 3
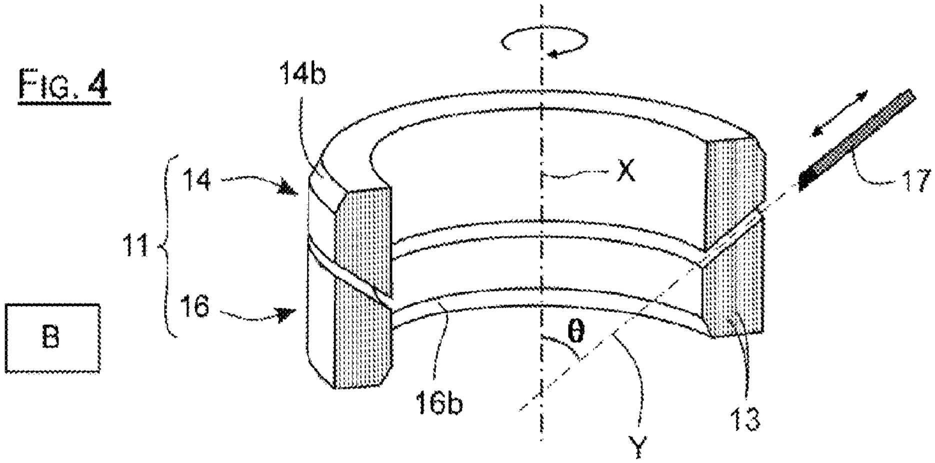
FIG. 4
FIG. 5
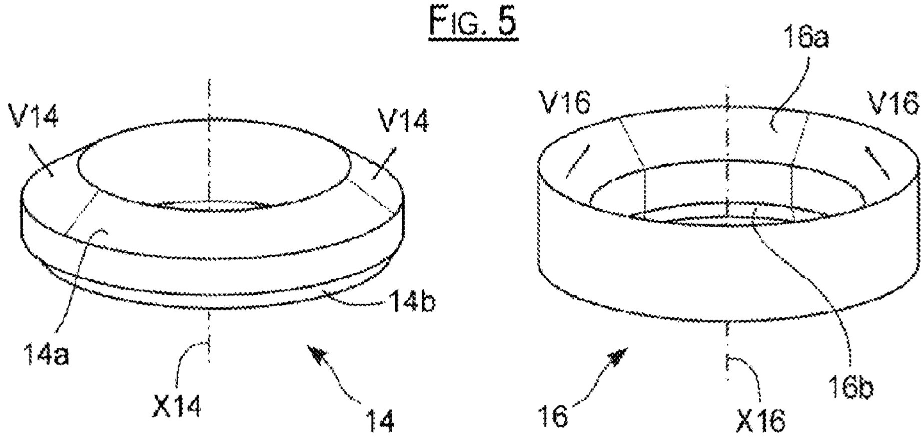

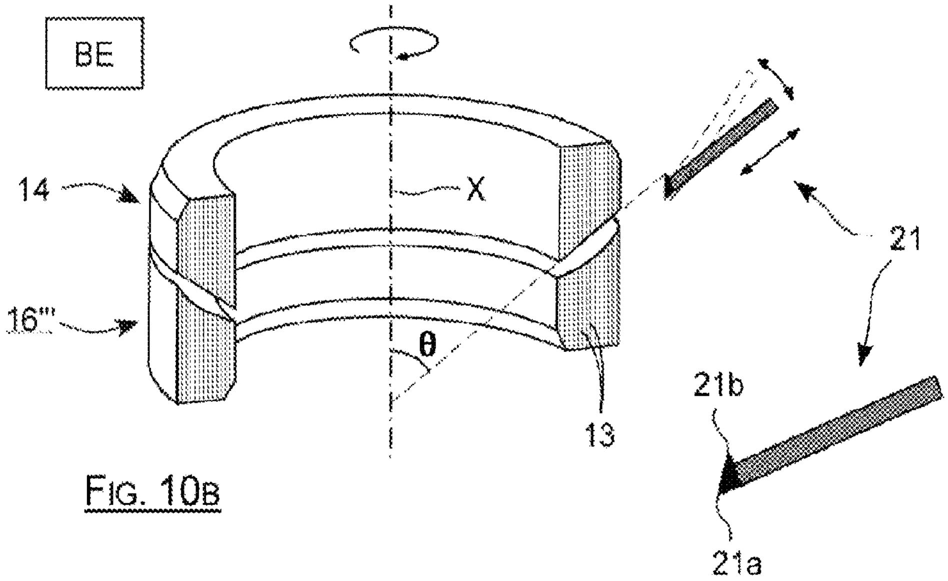
FIG. 10B
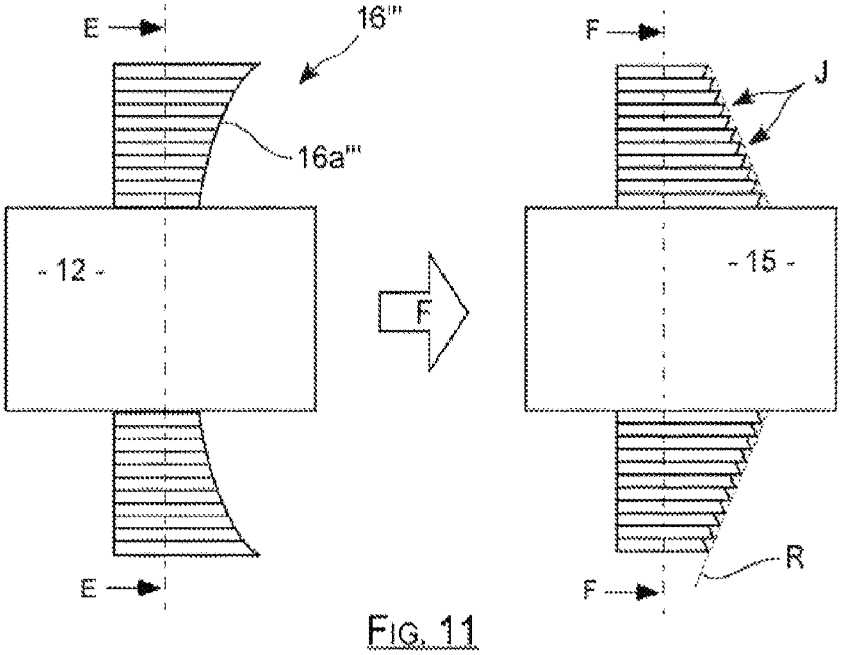
FIG. 11
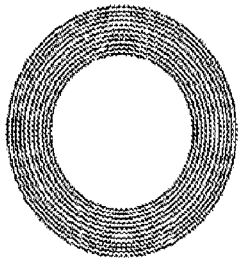
E - E
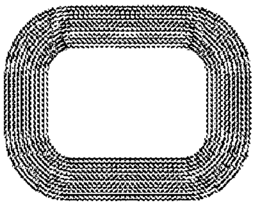
F - F

METHOD FOR MANUFACTURING LOOPS FOR A MAGNETIC CIRCUIT

This is the National Stage of PCT international application PCT/FR2021/051262, filed on Jul. 8, 2021 entitled "METHOD FOR MANUFACTURING LOOPS FOR A MAGNETIC CIRCUIT", which claims the priority of French Patent Application No. 2007578 filed Jul. 20, 2020, both of which are incorporated herein by reference in their entireties.

TECHNICAL FIELD

The invention relates to the magnetic circuits for magnetic induction devices, such as three-phase power transformers, and more particularly relates to a method for manufacturing loops constituting such magnetic circuits.

BACKGROUND OF THE INVENTION

A power transformer comprises a magnetic circuit, commonly called core, as well as coil blocks placed around this magnetic circuit to ensure an inductive coupling.

With reference to the appended FIG. 1, the magnetic circuit 2 of a three-phase transformer 1 can, in a known manner, be in the form of a three-dimensional prismatic cage, being formed from the association of three loops 3 which are juxtaposed in pairs by extending relative to each other at an angle of 60°, triangularly. These loops 3 are of prismatic shape, namely each have a generally rectangular contour, and are shaped so as to each have an oblique junction surface 4 extending at an angle value of 30° relative to the plane of extent of the corresponding loop. The loops 3 form in pairs, at their junction, the columns 6 of the magnetic circuit 2 around each of which a coil block 7 is placed. In practice, the assembly of the coil blocks results in splitting each loop 3 into two half-loops taking the form of the letter U and each comprising two cutting faces, which are then globally reconstituted through the coil blocks by keeping the cutting faces face to face.

The loops 3 are usually manufactured by stacking layers of magnetic material. One of the methods adopted by manufacturers to obtain such a stack of layers consists in winding a magnetic strip band around a rectangular section mandrel.

In order to delimit the oblique junction surface 4 in the case of manufacturing the loops 3 by winding a strip, a first method known from the state of the art consists in adjusting, upstream of the winding around the rectangular section mandrel, the width of the band by means of laser cutting. Nevertheless, the use of this method reveals, in practice, the appearance of burrs, namely irregularly formed excesses of material, along the cutting edge, which are sources of short-circuiting and undesirable spaces between the layers once the winding is performed.

An alternative method to the pre-cutting of the strip, illustrated in FIG. 2, consists in winding, around a rectangular section mandrel, a magnetic strip band 8 of constant width, then proceed to a chamfering of edges, marked by H, by machining, electroerosion, or water jet cutting. This method allows overcoming the surface defects noted in the case of laser cutting of the strip, but nevertheless always induces, in the same manner, expensive material scraps. This method, which is both loss-generating and time-consuming, therefore appears to be perfectible.

The aim of the invention is therefore to propose a solution for the manufacture of magnetic circuit loops allowing limiting the waste of material and overall production costs.

DISCLOSURE OF THE INVENTION

To this end, the invention relates to a method for manufacturing magnetic circuit loops for a multi-phase transformer from a magnetic strip, the method comprising at least the steps of:

a) providing a magnetic strip of constant width in the form of a cylindrical roll extending along a longitudinal axis;
b) cutting the roll into sections to extract therefrom first and second half-rolls of longitudinal axis each comprising a respective boundary surface which is formed once it is separated from the other half-roll, the roll being cut slantwise relative to the longitudinal axis, such that the orientation of the boundary surfaces is opposite: the first half-roll comprises a boundary surface outwardly oriented relative to its longitudinal axis, while the second half-roll comprises a boundary surface inwardly oriented relative to its longitudinal axis;
c) aligning the first and second half-rolls into conformity to form two loops, including at least one sub-step of reversely unwinding and rewinding the second half-roll on a mandrel. With this solution, the material scraps, and consequently the manufacturing costs, are limited relative to the manufacture of loops in accordance with the state of the art which requires the formation of a coil on a mandrel followed by an edge chamfering.

The invention also relates to a method for manufacturing loops thus defined, in which the alignment c) of the first and second half-rolls into conformity comprises a sub-step of straightening a crowning appearing at the end of the step of reversely unwinding and rewinding the second half-roll on the mandrel, this crowning corresponding to the contour of the boundary surface at the end of the reverse unwinding and rewinding sub-step, such that the orientation of the boundary surface of the second half-roll after straightening corresponds to the orientation of the boundary surface of the first half-roll.

The invention also relates to a method for manufacturing loops thus defined, comprising a sub-step of hollowing the boundary surface of the second half-roll before the sub-step of reversely unwinding and rewinding on the mandrel, this hollowing sub-step countering the appearance of a crowning corresponding to the contour of the boundary surface after reverse rewinding, such that the orientation of the boundary surface of the second half-roll at the end of the reverse unwinding and rewinding on the mandrel corresponds to the contour of the boundary surface of the first half-roll.

The invention also relates to a loop manufacturing method thus defined, comprising an additional step of shape transition d) after the step of aligning the first and second half-rolls into conformity, this step of shape transition d) comprising an upright unwinding and rewinding of the first half-roll and the second half-roll on another mandrel with a non-circular section.

The invention also relates to a loop manufacturing method thus defined, in which the other mandrel is of generally rectangular section.

The invention also relates to a loop manufacturing method loops thus defined, in which the mandrel is of non-circular section; and in which the step of aligning the first and second half-rolls into conformity, comprises an additional sub-step of upright unwinding and rewinding of the first half-roll on the mandrel. The invention also relates to a loop manufacturing method thus defined, in which the mandrel is of generally rectangular section.

The invention also relates to a method for manufacturing a magnetic circuit for a multi-phase transformer, comprising:

the production of at least three loops in accordance with the loop manufacturing method thus defined, the end-to-end arrangement of the loops to form a closed contour, the loops being contacted at their boundary surface.

The invention also relates to a method for manufacturing a power transformer, comprising a magnetic circuit having a three-dimensional cage shape, this magnetic circuit being formed of a plurality of loops arranged end-to-end along a closed contour, of which two of these loops are manufactured in accordance with the loop manufacturing method thus defined.

BRIEF DESCRIPTION OF THE DRAWINGS

FIG. 3 illustrates a step of manufacturing a roll by winding a magnetic strip band on a cylindrical mandrel, based on which loops are manufactured;

FIG. 4 illustrates a step of cutting the roll of FIG. 3 into sections;

FIG. 5 is a schematic view of first and second half-roll obtained at the end of the step of cutting into sections;

FIG. 10B illustrates a step simultaneously associating a cutting of the roll of FIG. 3 into sections to form first and second half-rolls, and a hollowing of the second half-roll to counter the appearance of a crowning;

FIG. 11 illustrates a step of reversely unwinding and rewinding the second half-roll on a rectangular section mandrel after the hollowing step;

DETAILED DISCLOSURE OF PARTICULAR EMBODIMENTS

Figure 1:
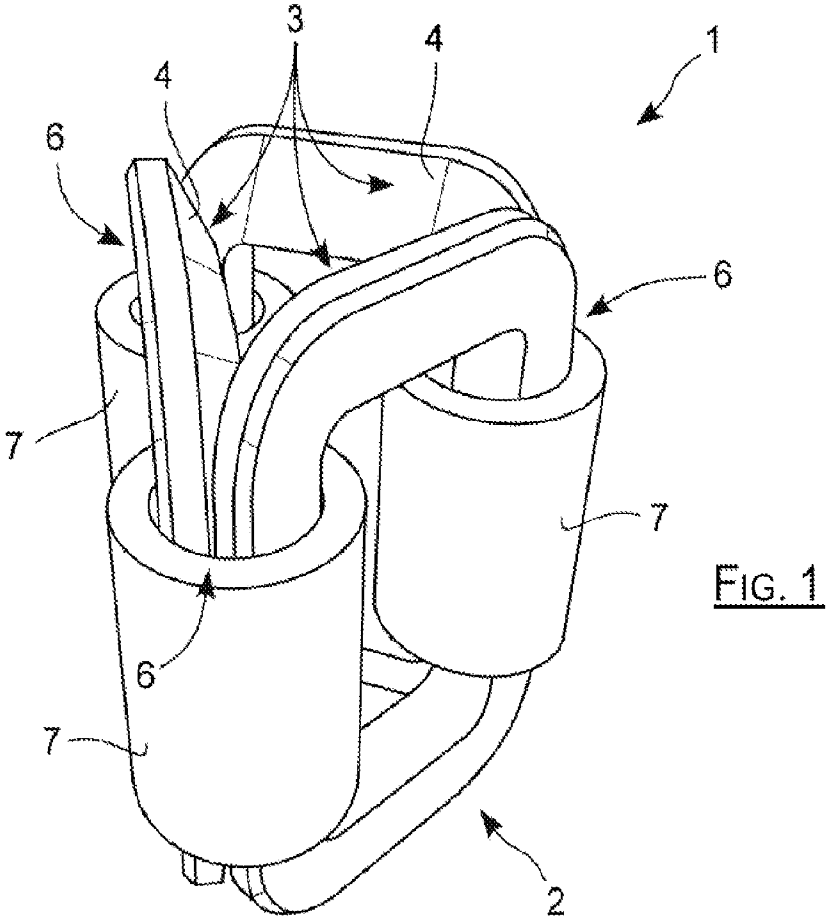
FIG. 1, already described, is a schematic perspective view of a three-phase transformer comprising a magnetic circuit and coil blocks.

The method according to the invention is part of a desire to optimise the manufacture of the loops 3 of the magnetic circuit 2 of FIG. 1, from a magnetic strip band.

The idea underlying the invention is based on the improved compatibility of a machining operation applied to a circular contour of a part relative to a machining operation applied to a non-circular contour, such as the rectangular contour of the loops 3.

With regard to this principle, the process for manufacturing loops 3 according to the invention begins with a step A of forming a roll with a cylindrical section/contour, marked with 11 in FIG. 3, by winding around a first mandrel 12, with circular section and of longitudinal axis X, a magnetic strip band 13 having dimensions of constant thickness and width.

Then, two half-rolls 14, 16 of complementary shapes and equivalent volumes are extracted from the roll 11 by advantageously using a parallel lathe during a step of cutting into sections, denoted B. These two half-rolls 14, 16 will become, at the end of the method, two loops 3 for magnetic circuits.

For this, the roll 11 is held on either side of the longitudinal ends thereof, by jaws with a concentric clamping function on a workpiece holder of the parallel lathe, the assembly driven in rotation by a spindle, the longitudinal axis X of the roll corresponding to the axis of rotation of the spindle.

This step B of cutting into sections consists, when the roll 11 is rotated about its longitudinal axis X, in machining a groove of constant width from the peripheral contour of the roll 11 to crossing it with a cutting tool, marked by 17 in FIG. 4. The cutting tool is displaced in a rectilinear manner along a driving direction Y extending at an angle θ relative to this longitudinal axis X. After cutting into sections, it follows obtaining the first and second half-rolls 14, 16 of respective longitudinal axis X14, X16. The invention advantageously provides for driving the roll 11 in the direction of rotation which tends to tighten the spiral formed by the winding of the magnetic strip band 13, so as to eliminate a band deformation during the cutting into sections.

As a result of this step B of cutting into sections, each of the two obtained half-rolls 14, 16 comprises a respective boundary surface, denoted 14*a*, 16*a*, which is formed by the cutting tool, as illustrated in FIG. 4. These boundary surfaces 14*a*, 16*a* are frustoconical and extend at an equivalent angle relative to the overall plane of the corresponding half-roll 14, 16.

With reference to FIG. 4, the first half-roll 14 has a boundary surface 14*a* called "outer" or "outgoing" boundary surface in that any vector V14 normal to this surface does not meet the longitudinal axis X14; while the boundary surface 16*a* of the second half-roll 16, of opposite orientation, is called "inner" or "re-entrant" boundary surface in that any vector V16 normal to this surface meets the longitudinal axis X16. Also, the step B of cutting into sections is performed such that the longitudinal extents of the first half-roll 14 measured at the inner periphery thereof and the outer periphery thereof correspond respectively to the longitudinal extents of the second half-roll 16 at the outer periphery thereof and the inner periphery thereof. In other words, the cross section of the second half-roll 16 corresponds to the post-cutting inverted cross section of the first half-roll 14.

This step B of cutting into sections, which is simple to carry out and specifically adapted for machining parts with a circular contour, allows forming frustoconical boundary surfaces 14*a*, 16*a* each intended to become the oblique junction surfaces 4 of the loops 3 with a rectangular contour of FIG. 1. After the step of cutting into sections, it is about shaping the first and second half-rolls 14, 16 to comply with the architecture of the loops 3.

Figure 2:
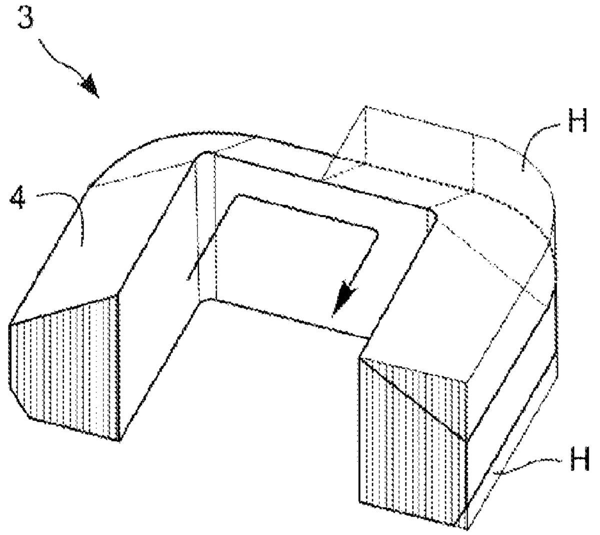
FIG. 2, already described, is a partial schematic perspective view of a magnetic circuit loop.

In the example of FIGS. 1 and 2, the loops 3 each have an oblique junction surface 4 extending at an angle value of 30° relative to the loop plane. In this respect, the invention judiciously provides that:

the first mandrel 12, used to form the roll 11, has a diameter corresponding to the length of the internal contour of the loops 3, the length of the used magnetic strip band 13 is adapted such that the roll 11 has a thickness equivalent to the loops 3 to be formed and, additionally, the value of the cutting angle θ, measured relative to the longitudinal axis X of the roll 11, i.e. 60°.

Based on this, the shaping of the loops 3 will be described according to a first embodiment of the method according to the invention, with reference to the appended FIGS. 6 to 9. The first half-roll 14 has a cross-sectional section which corresponds to the sectional section of a loop 3 as illustrated in FIG. 1, in particular relative to the boundary surface 14*a* thereof, but has a circular contour, namely which differs from the expected rectangular contour. In this respect, the work on the first half-roll 14, to form a loop 3, consists of a single shape transition, passing from a circular contour to a rectangular contour.

To this end, the step of the method, associated with the manufacture of a first loop 3 for a magnetic circuit from the first half-roll 14, consists in unwinding it to rewind it around a second mandrel 15 of which:

the circumference is equivalent to the diameter of the first circular mandrel 12 used to form the roll 11; and the section corresponds to the internal contour of loop 3, namely generally rectangular to comply with the example of FIG. 1.

Figure 6:
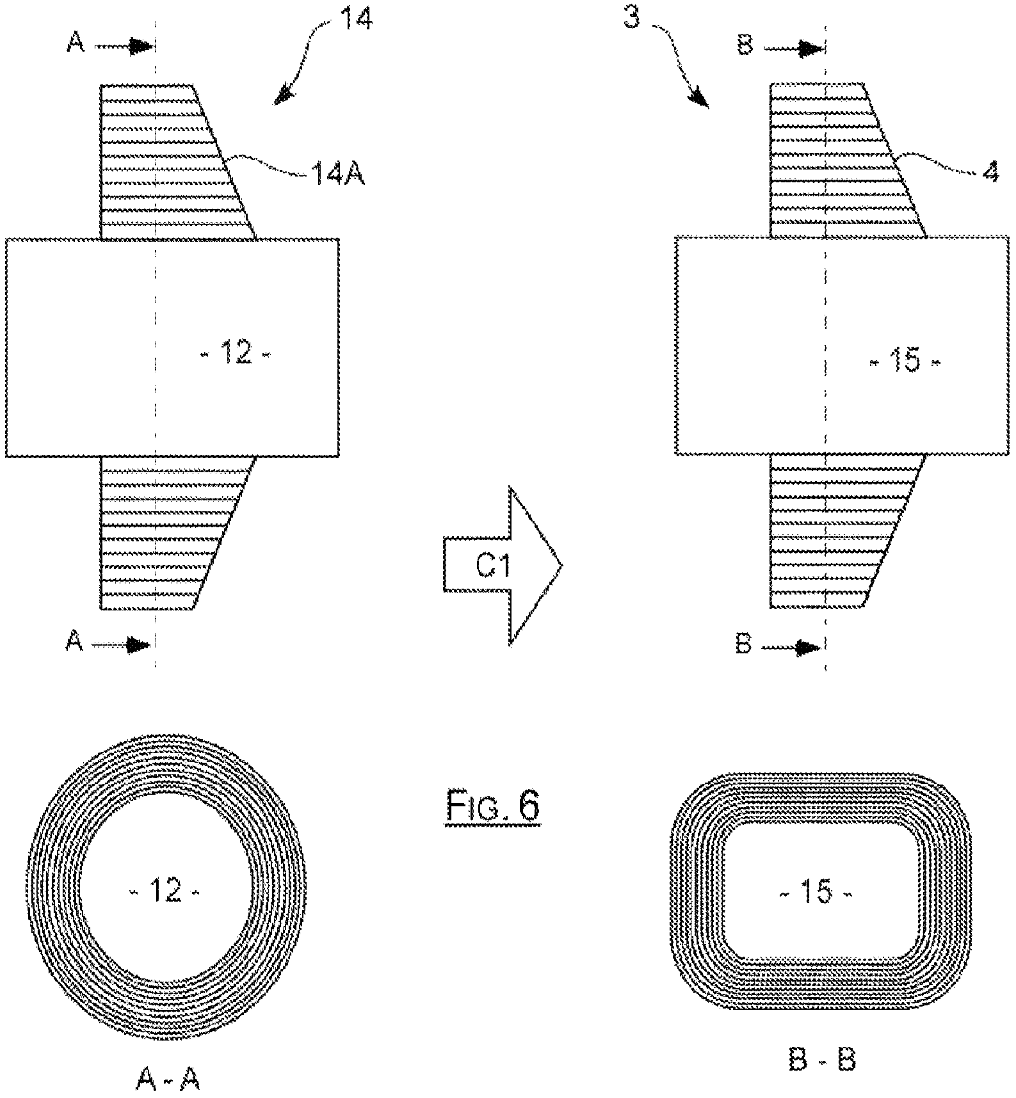
FIG. 6 illustrates a step of upright unwinding and rewinding of the first half-roll on a rectangular section mandrel.

This rewinding is performed upright, so that the layers of magnetic strip 13 are stacked identically. In other words, it is that the layer delimiting the outer periphery of the first half-roll 14 in its shape with a circular contour, still corresponds to the layer which delimits the outer periphery of the loop 3 thus obtained, as illustrated in FIG. 6.

With regard to the second half-roll 16, both its cross-sectional section and its shape differ from those expected of a loop 3 as represented in FIG. 1.

Figure 7:
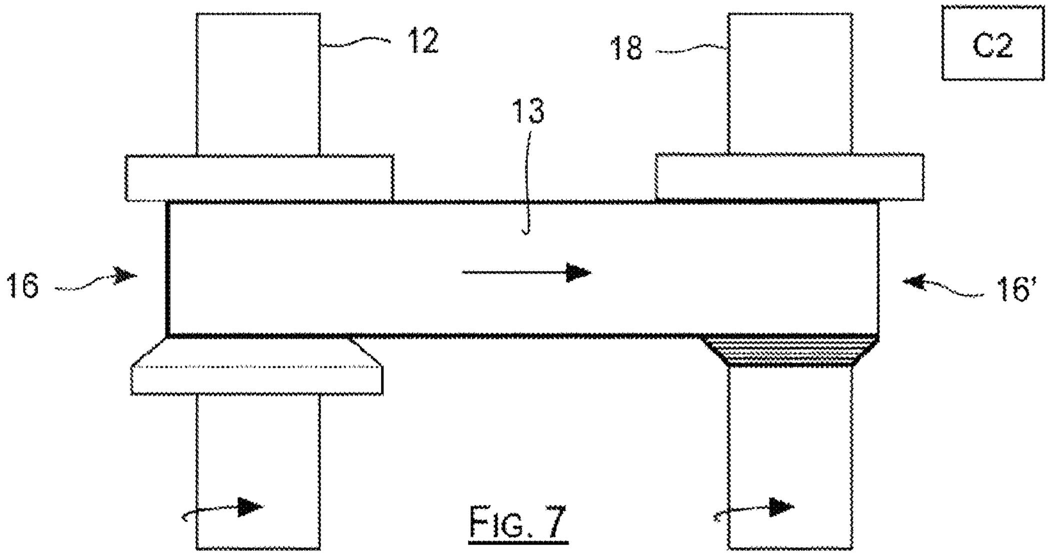
FIG. 7.
Figure 8:
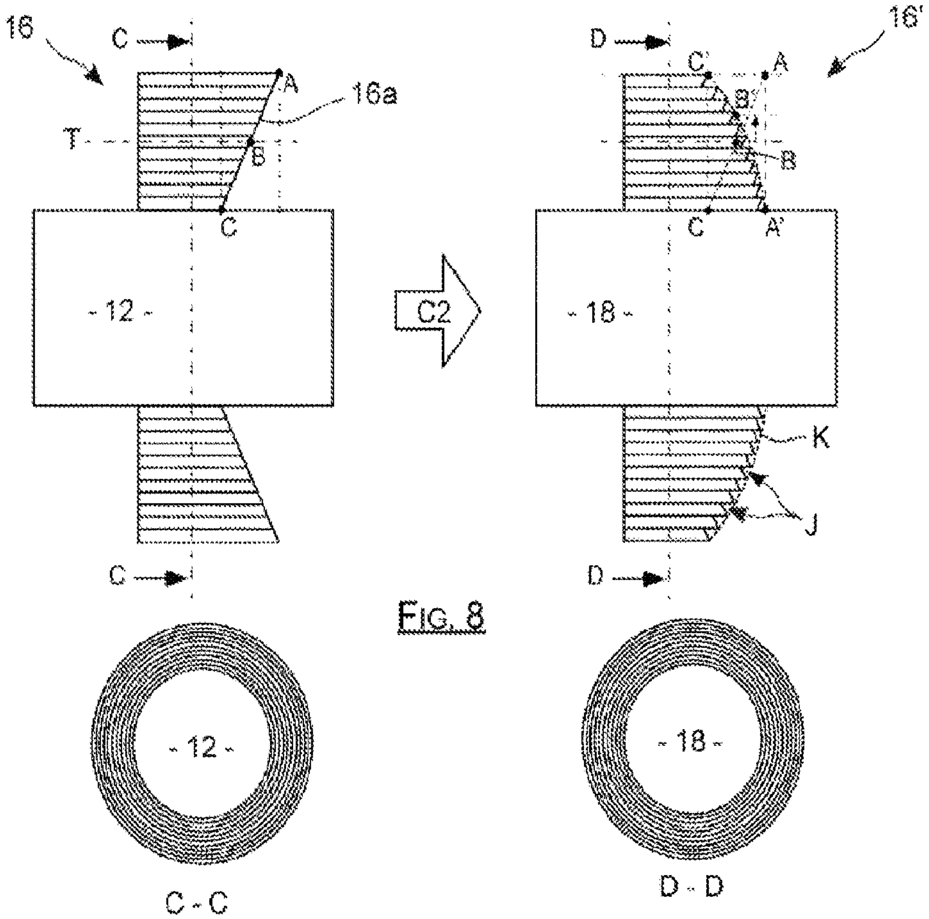
FIG. 8 illustrate a step of reversely unwinding and rewinding the second half-roll on a circular section mandrel.
Figure 9:
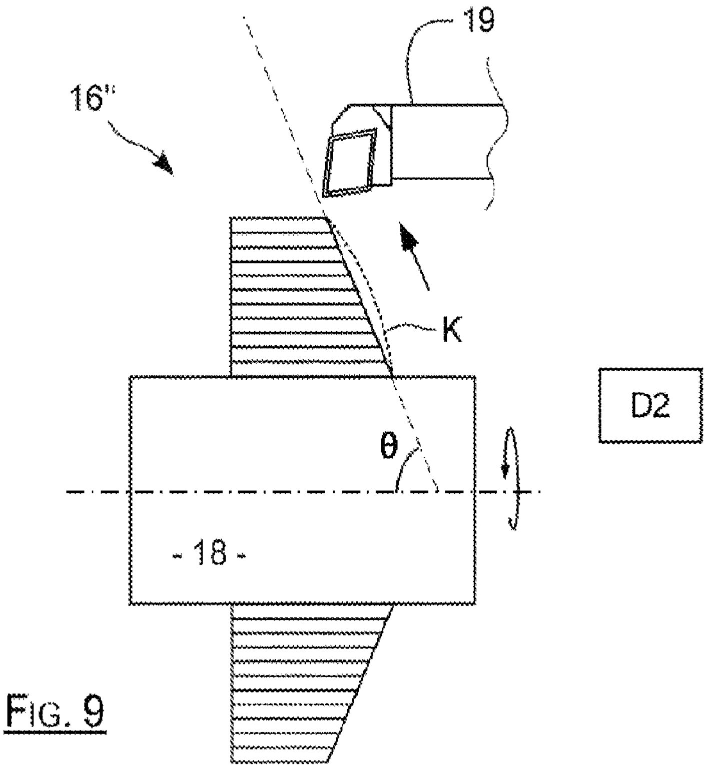
FIG. 9 illustrates a step in straightening a crowning.

In this regard, the invention provides a section transition step so as to make the second half-roll 16 identical to the first half-roll 14 in its post-cutting state, this before performing a shape transition step to obtain a second loop 3. This section transition step is established in two successive sub-steps, denoted C2 and D2. With reference to FIGS. 7 and 8, the first sub-step C2 consists in unwinding the second half-roll 16 by simultaneously reversely rewinding it around a third mandrel 18 with a circular contour and of a diameter equivalent to the first used mandrel 12 to form the roll 11. In opposition to an upright rewinding, this reverse rewinding leads to the fact that the magnetic strip layers 13 are reversely stacked. Concretely, it is intended that the strip layer delimiting the outer periphery of the second half-roll 16 at the end of the cutting step, corresponds to the layer which delimits the inner periphery of this second half-roll in its state at the end of this first step, denoted 16'.

With reference to FIG. 7, it is found at the end of sub-step C2 the appearance of a crowning K, and streaks or grooves J. These streaks J result from the inversion of the cutting angle of the magnetic strip layers 13. With regard to the crowning K, it results from a difference in length of magnetic strip band 13 observed before sub-step C2 between:

a first length measured from a point A to a point B both located on the boundary surface 16*a*, respectively at the outer periphery and the midline T of the cross-sectional section of the second half-roll 16, and a second length measured from point B to a point C, this point C being located on the boundary surface 16*a* and at the inner periphery of the second half-roll 16.

By considering points A', B' and C' corresponding respectively to the points A, B and C once the reverse rewinding has taken place, namely at the end of sub-step C2, this difference in length which is found leads to more magnetic strip layers 13 separating the points A' and B' than layers separating the points B' and C' after sub-step C2, thus forming the crowning K.

In this respect, it is understood that this first sub-step C2 does not allow finding the section of the first half-roll 14, which the second sub-step D2 aims at correcting. This second sub-step D2 consists of an operation for straightening the crowning K, advantageously carried out with a parallel lathe and an envelope working tool 19 which is displaced linearly along an inclined plane at the angle θ relative to the axis of the half-roll 16'. The removal of this crowning K results in making the second half-roll, denoted 16" at this stage, more or less in conformity with the first half-roll 14.

Given that the first step of shaping the second half-roll 16 tends to make it identical to the first half-roll 14, the next step of shaping the second half-roll corresponds to the step C1 described to obtain a loop 3, namely consists in a shape transition by upright rewinding on the second mandrel 15 of generally rectangular section.

At the end of the step B of cutting into sections, the shaping of a loop 3 from the second half-roll 16 has been explained above according to a first embodiment of the invention. This first embodiment provides for removing by machining the crowning K which appears, due to the frustoconical character of the boundary surface 16*a*, after reverse rewinding (sub-steps C2 and D2).

Alternatively, according to a second embodiment, the method aims at countering the appearance of the crowning K by hollowing the boundary surface 16*a* of the second half-roll 16, so that a reverse rewinding generates a generator surface which is substantially rectilinear, and not curved. As understood, this second embodiment of the method differs from the first embodiment with respect to the shaping of the second half-roll 16.

Figure 10A:
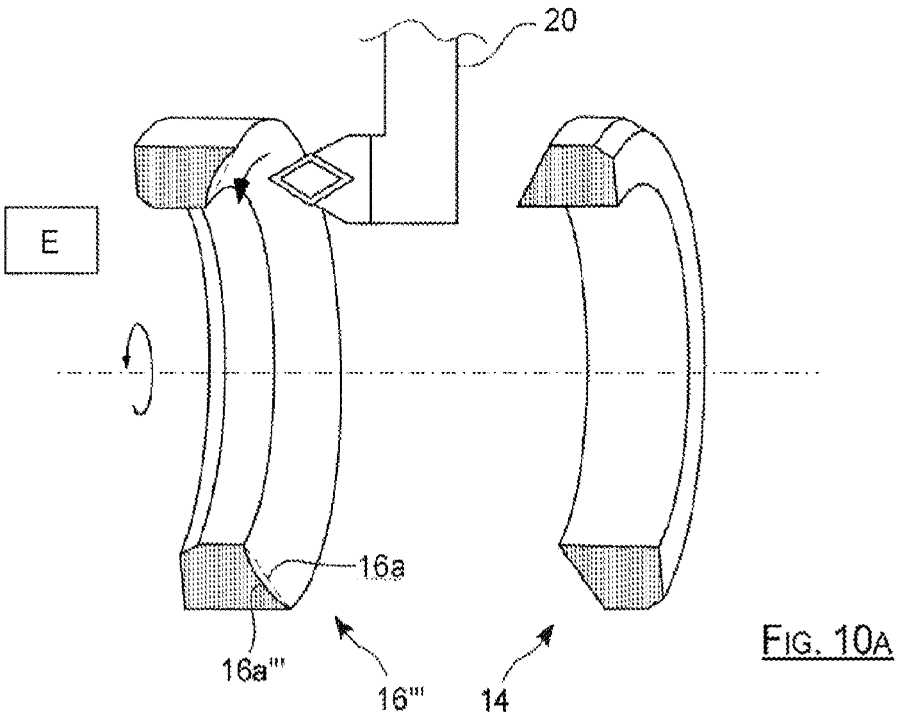
FIG. 10A illustrates a step of hollowing the second half-roll to counter the appearance of a crowning.

More specifically, and with reference to the appended FIG. 10A, the shaping of the second half-roll 16 according to the second embodiment is ensured in two successive steps. The first step, which consists in hollowing the boundary surface 16*a* to generate a counter-crowning, is advantageously carried out by straightening with a parallel lathe which introduces a rotation of the second half-roll 16 about its axis X16 and an envelope working tool 20 which moves along a curve to machine.

At the end of this first step, denoted E, the second step F consists in unwinding the second half-roll, denoted 16''' at the end of the first step E, by reversely rewinding it simultaneously around the second mandrel 15 with a generally rectangular section as previously described. As understood, the trajectory of the tool 20 is controlled so that the counter-crowning surface resulting from its passage, denoted 16*a'''*, counterbalances the difference in initial magnetic strip band length 13 as described on the base of FIG. 7. At the end of step F, the second half-roll generally corresponds to a loop 3 as represented in FIG. 1, by comprising in particular a substantially rectilinear generator surface denoted R, but is nevertheless locally distinguished by a junction surface which is crenelated, not smooth. This identified particularity results from the inversion of the cutting angle of the magnetic strip layers 13 after reverse rewinding, leading to the appearance of streaks J.

In practice, the use of loops with a crenelated junction surface, and not a smooth one, is not restrictive in the context of the formation of a magnetic circuit 2 of a three-phase transformer 1 as shown in FIG. 1. Since the magnetic flux not circulating from one loop to the other within the framework of such a magnetic circuit 2, it follows that it is not necessary to rigorously ensure a flat support contact of the junction surfaces 4 of the juxtaposed loops 3.

Nevertheless, it can be considered to provide an additional step aimed at straightening the streaks J so as to strictly conform to the morphology of the loops 3 as illustrated in FIGS. 1 and 2, without departing from the scope of the invention. In this case, it may be desirable to provide the second half-roll 16 which is slightly longer, when cutting into sections, so as to compensate for the operated material removal.

In practice, it is possible to hollow the boundary surface 16*a* to counter the appearance of the crowning, directly during the cutting of the roll 11 into sections. In other words, it is admissible according to the second embodiment of the invention to merge the steps B and E. This feature is particularly to be favoured when it becomes too restrictive to separate the two half-rolls 14 and 16 at the end of the step B of cutting into sections, which is necessary to carry out step E of hollowing the boundary surface 16*a* as illustrated in FIG. 10A. With reference to FIG. 10B, the association of the cutting into sections B and the first step E, denoted BE, is generally performed like the step B of cutting into sections as illustrated in FIG. 4, but is distinguished therefrom by the used tool used and the cutting operation.

More specifically, the cutting tool, marked by 21, is distinguished from the tool 20 used in the case of the step B of cutting into sections as illustrated, with regard to the head thereof, that is to say from its active portion to the cutting of the material. The head of the tool 20 which is used during step B is in the form of a bevel which extends continuously without forming any discontinuity in the extension of the rod which supports the head, by forming a tip at the end of the tool. The head of the tool 21 is also in the form of a bevel extending in the extension of the rod to form a first tip 21*a* at the end of the tool, but also protrudes transversely by forming a second tip 21*b* at the junction.

Just like the tool 20 during step B, the tool 21 is displaced as a whole during step BE in a rectilinear manner along the driving direction Y extending at the angle θ relative to this longitudinal axis X. Moreover, a variation in the orientation of the tool 21 is operated around the second tip 21*b*, forming a pivot point which is displaced only along the driving direction Y, so that:

- the boundary surface 14*a* of the first half-roll 14 is formed frustoconically by the passage of the second tip; and
- the counter-crowning surface 16*a*" of the second half-roll 16" is formed by the passage of the first point 21*a* which moves along a curve when the orientation of the tool 21 varies.

Figure 12:
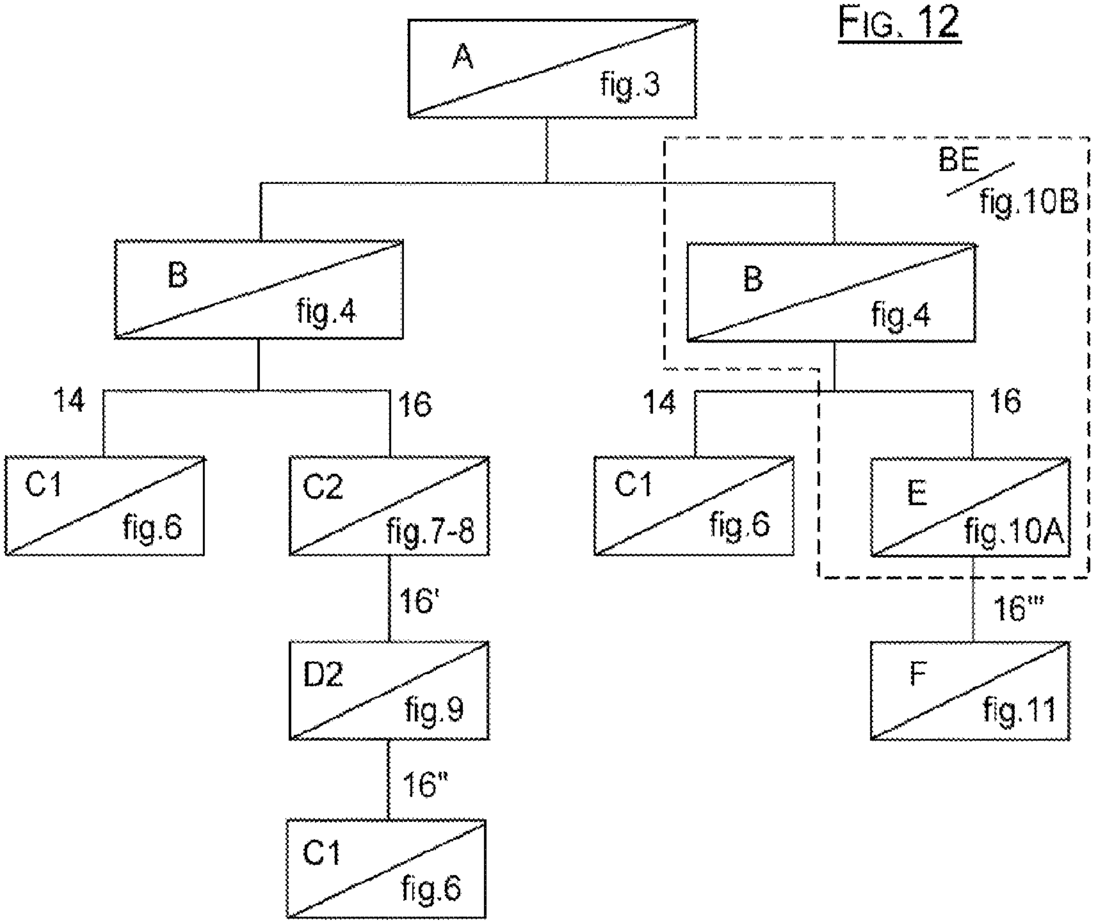
FIG. 12 is a flowchart of two possible methods for manufacturing loops according to the invention.

The method according to the invention has been explained in the context of manufacturing a pair of prismatic loops 3 from two half-rolls 14 and 16 with cylindrical contours and inverted sections, which are extracted from a roll 11 of magnetic strip 13 by cutting into sections. With reference to the summary flowchart of FIG. 12, the manufacture of a first loop is based on a single shape transition operation C1 which consists in an upright unwinding and rewinding of the half-rolls 14 on a mandrel 15 with a generally rectangular section, while the manufacture of the other loop can be performed according to two protocols which:

- require both a section transition and a shape transition applied to the other half-roll 16, implying for each of the protocols a step of reversely unwinding and rewinding C2, F,
- are particularly distinguished on the manner used to solve a loop non-conformity problem by appearance of a crowning K: one of the protocols requires a step D2 of removing by machining the crowning K once it appears at the end of the reverse rewinding C2, while the other requires, on the contrary, anticipating and overcoming the appearance of such a crowning K by forming a hollow counter-curved surface upstream of the reverse rewinding step F. The counter-crowning surface can be established during a step E associated with aligning the first and second half-rolls into conformity after the step B of cutting into sections, or established at the same time as the cutting into sections during a step BE.

In order to limit the execution times and band scraps, the invention judiciously provides for the machining step D2, E of the considered protocol to be carried out by turning before the shape modification of the half-roll 16 by rewinding on mandrel with a generally rectangular section 15.

The method which has the fewest steps consists of sequencing the steps A, B, BE, F then C1.

In order to manufacture the loops 3 of FIG. 1, the different steps of the method according to the invention have been described by respecting certain dimensioning criteria, namely that:

- the first, second and third used mandrels 12, 15, 18 have equal diameters of a value corresponding to the internal circumference of the loops 3,
- the length of the magnetic strip band 13 which is used is adapted such that the roll 11 has a thickness equivalent to the loops 3 to be formed and,
- the angle θ has a value of 60°.

Regarding the second mandrel 15, of substantially rectangular section, it is understood that as the last destination mandrel, on which the half-rolls are wound to adopt the shape of the loops 3, its perimeter must necessarily correspond to the internal loop circumference. Nevertheless, the invention is not limited to the compliance with the aforementioned diameter criterion with regard to the first and third mandrels 12 and 18, as well as the cutting angle value θ based on the existence of a geometric link diameter-angle θ explained generically below with reference to FIG. 13.

Figure 13:
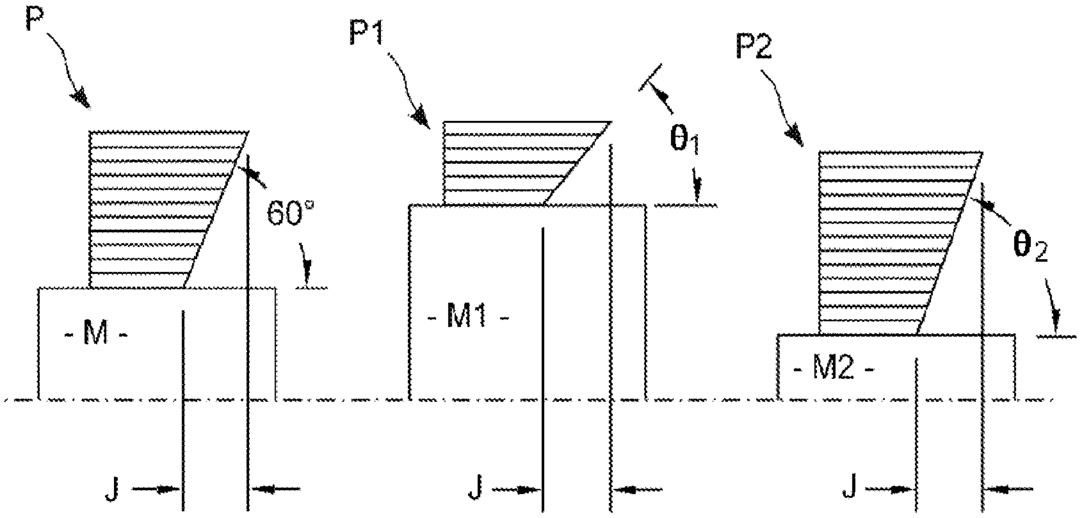
FIG. 13 illustrates the relationship between the mandrel diameter and the cutting value angle.

In this FIG. 13, a "control" configuration is illustrated, which is in compliance with the aforementioned dimensioning criteria. This control configuration comprises a first mandrel M whose diameter corresponds to the internal circumference of a loop 3 of FIG. 1, and which carries a half-roll P resulting from cutting into sections at an angle of 60°. By applying the method as described at this stage, this half-roll P becomes a loop as defined in FIG. 1. A dimension J will be noted corresponding to the distance separating the length projected on the mandrel from the boundary surface formed by cutting into sections.

A first configuration differs from the control configuration, in that it has a mandrel M1, of larger diameter than the control mandrel M, which carries a half-roll P1 formed of a band of length equivalent to that used in the control configuration (by considering the fall of material after cutting into sections), to present a band volume equivalent to the control half-roll P. It is possible to achieve the formation of a loop 3 according to FIG. 1 by application of the method, with a cutting angle θ1 which is less than 60° and which is defined so as to be in compliance with the dimension J.

A second configuration differs from the control configuration in that it has a mandrel M2, this time with a diameter less than the control mandrel M, which carries a half-roll P2 formed of a band of length equivalent to that used in the control configuration. It is also possible to achieve the formation of a loop 3 according to FIG. 1 by application of the method according to the invention with a cutting angle θ2 which is greater than 60° and which is defined so as to be in compliance with the dimension J.

As understood, a flexibility of execution of the method according to the invention is granted, by allowing modulating the angle value θ of steps B and D2 and the diameter of the first and third mandrels 12, 18 introduced in steps A and C2 to manufacture loops 3 according to FIG. 1.

It should also be noted that the method according to the invention is not limited to the production of loops adopting the particular morphology of FIG. 1.

Indeed, it is understood that the method according to the invention is not limited to the production of loops having junction surfaces extending at an angle of 30° relative to the loop plane, by defining the angle θ just as needed.

Similarly, any type of shape of loops 3 can be considered in practice without departing from the scope of the invention. Concretely, this means that the second rectangular section mandrel 15 can be substituted by a mandrel with a section adapted to the shape of the loops to be manufactured.

In particular, it can be considered to produce loops with a circular contour by means of the method according to the invention, namely without involving the second rectangular section mandrel 15.

Furthermore, the invention provides for the possibility of enriching the method by additional machining operations which are advantageously carried out in turning, for example by longitudinal turning and straightening, such as to delimit, for example, corner surfaces marked by 14*b*, 16*b* in the example of FIGS. 4 and 5, also shown in FIG. 1, but not referenced.

In particular, the corner surface denoted 14*b* can be easily straightened in step B. The corner surface denoted 16*b* can be easily straightened in step D2, but also more difficult to straighten in step B or E, with a counter-crowning. This counter-crowning is not essential in the case of the formation of the corner surface denoted 14*b*, because it is less pronounced and external in the assembly of the magnetic circuit 1 of FIG. 1.

Finally, the invention has been described in the case where the roll 11, manufactured from the magnetic strip band 13, is split into two half-rolls 14, 16 of the same volume. In this case, it is understood that the width and the length of the magnetic strip band 13 used to form the roll 11 are defined with regard to the dimensions of the loops to be manufactured. As a three-phase transformer comprises three loops, it can be considered to dimension the roll 11 so as to be able to judiciously extract from it several pairs each formed of a first and second complementary half-rolls 14, 16. Concretely, the application of the method according to the invention allows limiting the manufacturing costs when it is desired to manufacture at least two loops.

What is claimed is:

1. A method for manufacturing loops of magnetic circuits for a multi-phase transformer from a magnetic strip, the method comprising at least the steps of:

a) providing the magnetic strip of constant width in the form of a cylindrical roll extending along a longitudinal axis;

b) cutting the roll into sections to extract therefrom first and second half-rolls of the longitudinal axis wherein each half-rolls comprises a respective boundary surface which is formed once it is separated from the other half-roll, wherein the roll is cut slantwise relative to the longitudinal axis, such that an orientation of the boundary surfaces is opposite: the first half-roll comprises the boundary surface outwardly oriented relative to the longitudinal axis, while the second half-roll comprises the boundary surface inwardly oriented relative to its longitudinal axis; and c) aligning the first and second half-rolls into conformity to form two loops, including at least one sub-step of reversely unwinding and rewinding the second half-roll on a mandrel.

2. The method for manufacturing loops according to claim 1, wherein the alignment c) of the first and second half-rolls into conformity comprises a sub-step of straightening a crowning appearing at the end of the step of reversely unwinding and rewinding the second half-roll on the mandrel, wherein this crowning corresponds to a contour of the boundary surface at the end of the reverse unwinding and rewinding sub-step, such that the orientation of the boundary surface of the second half-roll after straightening corresponds to the orientation of the boundary surface of the first half-roll.

3. The method for manufacturing loops according to claim 1, further comprising of hollowing the boundary surface of the second half-roll before the sub-step of reversely unwinding and rewinding on the mandrel wherein the hollowing counters the appearance of a crowning corresponding to a contour of the boundary surface after reverse rewinding, such that the orientation of the boundary surface of the second half-roll at the end of the reverse unwinding and rewinding on the mandrel corresponds to the contour of the boundary surface of the first half-roll.

4. The method for manufacturing loops according to claim 2, further comprising shape transition d) after the step of aligning the first and second half-rolls into conformity, wherein the step of shape transition d) comprises an upright unwinding and rewinding of the first half-roll and the second half-roll on another mandrel with a non-circular section.

5. The method for manufacturing loops according to claim 4, wherein the other mandrel is has a generally rectangular section.

6. The method for manufacturing loops according to claim 3, wherein the mandrel has a non-circular section; and wherein the step c) of aligning the first and second half-rolls into conformity, comprises a sub-step of upright unwinding and rewinding of the first half-roll on the mandrel.

7. The method for manufacturing loops according to claim 6, wherein the mandrel has a generally rectangular section.

8. The method for manufacturing loops according to claim 1, wherein the loops have a prismatic shape and wherein the loops have a generally rectangular contour.

9. A method for manufacturing a magnetic circuit for a multi-phase transformer, comprising:

production of at least three loops with the method according to claim 1, an end-to-end arrangement of the at least three loops to form a closed contour.

10. A method for manufacturing a power transformer, wherein the power transformer comprises a magnetic circuit having a three-dimensional cage shape, wherein the magnetic circuit is formed of a plurality of loops arranged end-to-end along a closed contour, wherein at least two of the plurality of loops of the power transformer are manufactured according to the manufacturing method according to claim 1.

* * * * *